US006920424B2

(12) United States Patent  (10) Patent No.: US 6,920,424 B2
Padmanabhan  (45) Date of Patent: Jul. 19, 2005

(54) DETERMINATION AND USE OF SPECTRAL PEAK INFORMATION AND INCREMENTAL INFORMATION IN PATTERN RECOGNITION

(75) Inventor: Mukund Padmanabhan, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 599 days.

(21) Appl. No.: 09/785,605

(22) Filed: Feb. 16, 2001

(65) Prior Publication Data

US 2002/0010578 A1 Jan. 24, 2002

Related U.S. Application Data

(60) Provisional application No. 60/219,387, filed on Jul. 19, 2000, and provisional application No. 60/198,565, filed on Apr. 20, 2000.

(51) Int. Cl.$^7$ .............................................. G10L 15/00
(52) U.S. Cl. ...................................... 704/243; 704/207
(58) Field of Search ................................ 704/207, 209, 704/231, 243

(56) References Cited

U.S. PATENT DOCUMENTS 4,346,262 A * 8/1982 Willems et al. ............. 704/217
4,665,548 A * 5/1987 Kahn ......................... 704/237
5,463,716 A * 10/1995 Taguchi ..................... 704/209

OTHER PUBLICATIONS

Kay et al., "Spectrum Analysis—A Modern Perspective," Proceedings of the IEEE, vol. 69, No. 11, 1380–1419 (Nov. 1981).
Miller et al., "Ensemble Classification by Critic–Driven Combining," Department of Electrical Engineering, The Pennsylvania State University, University Park, PA.

Padmanabhan et al., "Recent Improvements in Voicemail Transcriptioin," IBM T. J. Watson Research Center, Yorktown Heights, NY.
Padmanabhan et al., "Resonator–Based Filter–Banks for Frequency–Domain Applications," IEEE Transactions on Circuits and Systems, vol. 38, No. 10 (Oct. 1991).
Saon et al., "Maximum Likelihood Discriminant Faeture Spaces," IBM T. J. Watson Research Center, Yorktown Heights, NY.
Schapire et al., "Boosting the Margin: A New Explanation for the Effectiveness of Voting Methods," The Annals of Statistics, vol. 26, No. 5, 1651–1686 (1998).

* cited by examiner

Primary Examiner—Daniel Abebe
(74) Attorney, Agent, or Firm—Ryan, Mason & Lewis, LLP

(57) ABSTRACT

Generally, the present invention determines and uses spectral peak information, which preferably augments feature vectors and creates augmented feature vectors. The augmented feature vectors decrease errors in pattern recognition, increase noise immunity for wide-band noise, and reduce reliance on noisy formant features. Illustratively, one way of determining spectral peak information is to split pattern data into a number of frequency ranges and determine spectral peak information for each of the frequency ranges. This allows single peak selection. All of the spectral peak information is then used to augment a feature vector. Another way of determining spectral peak information is to use an adaptive Infinite Impulse Response filter to provide this information. Additionally, the present invention can determine and use incremental information. The incremental information is relatively easy to calculate and helps to determine if additional or changed features are worthwhile. The incremental information is preferably determined by determining a difference between mutual information (between the feature vector and the classes to be disambiguated) for new or changed feature vectors and mutual information for old feature vectors.

32 Claims, 6 Drawing Sheets

DETERMINATION AND USE OF SPECTRAL PEAK INFORMATION AND INCREMENTAL INFORMATION IN PATTERN RECOGNITION

CROSS REFERENCE TO RELATED APPLICATIONS

This application claims the benefit of U.S. Provisional Application No. 60/219,387, filed Jul. 19, 2000, and U.S. Provisional Application No. 60/198,565, filed Apr. 20, 2000.

FIELD OF THE INVENTION

The present invention relates to pattern recognition techniques and, more particularly, relates to the determination and use of spectral peak information and/or similar incremental information in pattern recognition.

BACKGROUND OF THE INVENTION

In pattern recognition, pattern data is usually quantified by converting the data into feature vectors. For instance, in speech recognition, speech data is converted to feature vectors that commonly have 39 or 40 elements. The feature vectors are subsequently used to analyze the pattern data to determine patterns in the data. Generally, during training, a number of classes are developed. During real-time processing, new feature vectors, created from pattern data, can be assigned to particular classes and processed accordingly.

Researchers are constantly trying to decrease the error rate of pattern recognition. One way to do this is to modify the number and type of features in a feature vector. Some of these changes have improved pattern recognition, and others have not.

Unfortunately, the only way to currently determine if adding features to or changing features in a feature vector affects the error rate of a pattern recognition system is to use unmodified feature vectors, determine the error rate, modify the feature vectors, and determine the new error rate. If the new error rate is better than the original error rate, the additional or changed features have helped pattern recognition. This can be a time consuming and laborious process.

A problem associated more specifically with cepstral features in speech applications is that these features can get corrupted by wide-band noise. Thus, the noise immunity of cepstral features, in feature vectors, are less than ideal.

For speech applications, one feature that speech systems can analyze is a "formant" feature. Voiced sounds have a particular formant structure when viewed in the frequency domain. This formant structure is basically a spectral envelope that overlies an underlying speech amplitude curve, and it usually has three "humps" that decrease with increasing frequency. Conversely, unvoiced sounds have a fairly random structure when viewed in the frequency domain. Some speech processing systems try to determine representative formant features, which can include determining multiple peaks of the formant structure. Multiple peak selection can be fairly complex. Most speech processing systems also try to determine formant features even in unvoiced speech, which do not have formant structures. This can make the formant features very noisy for these unvoiced speech regions.

Consequently, what is needed is a better way of overcoming the problems of non-ideal pattern recognition when using feature vectors, lengthy and complex determination of whether new or different features improve pattern recognition, noise resistance of feature vectors, multiple peak selection for formant structures, and noisy formant features for unvoiced speech regions.

SUMMARY OF THE INVENTION

Generally, the present invention determines and uses spectral peak information, which preferably augments feature vectors and creates augmented feature vectors. The augmented feature vectors decrease errors in pattern recognition, increase noise immunity for wide-band noise, and reduce reliance on noisy formant features. Illustratively, one way of determining spectral peak information is to split pattern data into a number of frequency ranges and determine spectral peak information for each of the frequency ranges. This allows single peak selection. All of the spectral peak information is then used to augment a feature vector. Another way of determining spectral peak information is to use an adaptive Infinite Impulse Response filter to provide this information.

Additionally, the present invention can determine and use incremental information. The incremental information is relatively easy to calculate and helps to determine if additional or changed features are worthwhile. The incremental information is preferably determined by determining a difference between mutual information (between the feature vector and the classes to be disambiguated) for new or changed feature vectors and mutual information for old feature vectors.

A more complete understanding of the present invention, as well as further features and advantages of the present invention, will be obtained by reference to the following detailed description and drawings.

DETAILED DESCRIPTION OF PREFERRED EMBODIMENTS

Figure 1:
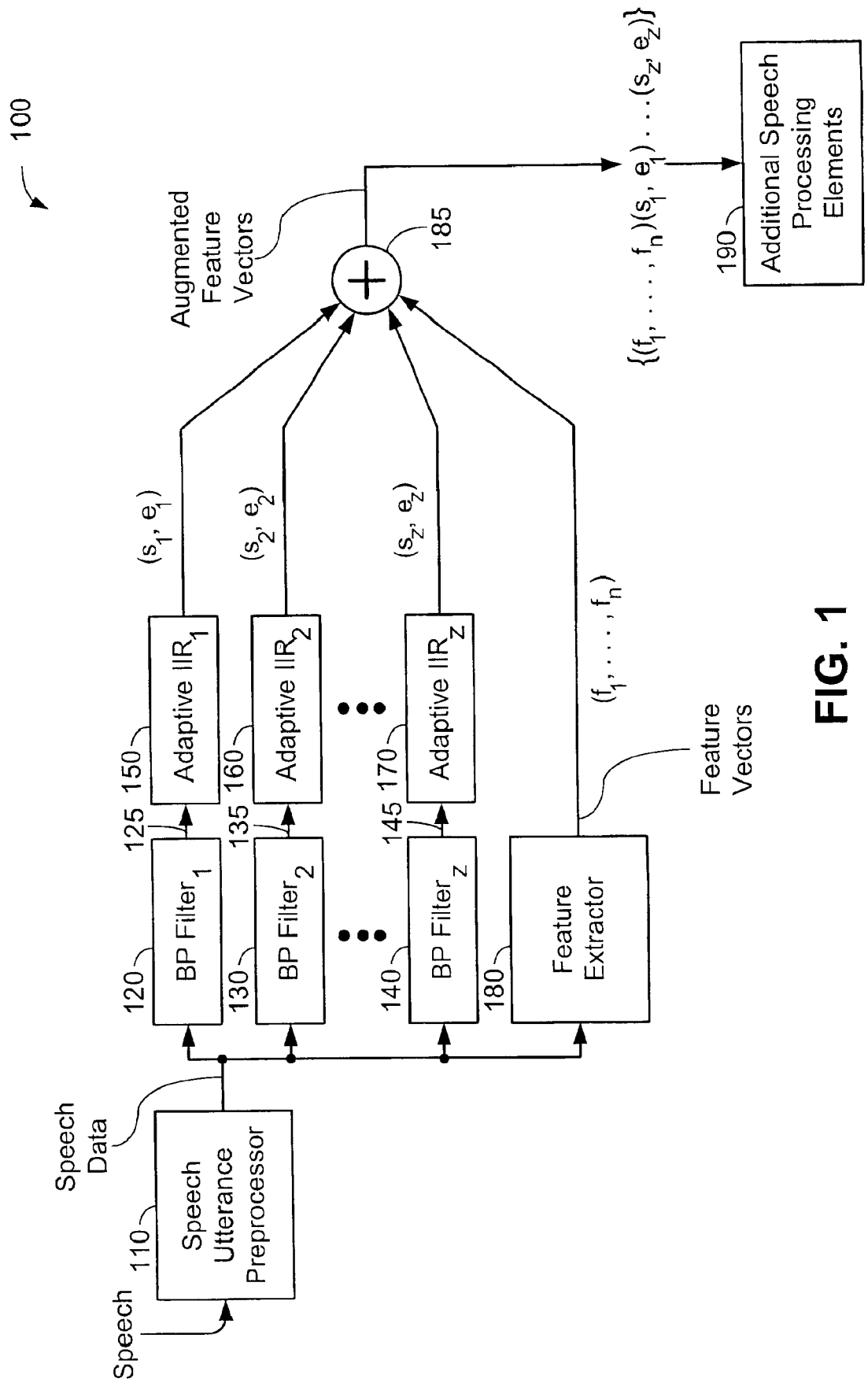
FIG. 1 is a block diagram of an exemplary system for processing speech in accordance with one embodiment of the present invention.

Referring now to FIG. 1, a speech recognition system 100 is shown that determines and uses spectral peak information and incremental information in speech recognition, in accordance with one embodiment of the present invention. System 100 comprises a speech utterance preprocessor 110, a number of band pass filters 120, 130 and 140, each producing a band pass filtered output 125, 135 and 145, respectively, a number of adaptive Infinite Impulse Response (IIR) filters 150, 160 and 170, a feature extractor 180, an augmenting device 185, and additional speech processing elements 190.

The speech utterance preprocessor 110 receives speech and generates representative speech waveforms, i.e., speech data. The speech utterance preprocessor 110 may include, for example, an audio-to-analog transducer (microphone) and an analog-to-digital converter that respectively transduce the utterances into an electrical signal and then convert the electrical signal into a digital signal representative of the uttered speech. Further, the preprocessor 110 may sample the speech signal and partition the signal into overlapping frames so that each frame is discretely processed by the remainder of system 100. The output signal of the preprocessor 110 is the sampled speech waveforms or speech data that is recorded and provided to band pass filters 120, 130 and 140 and feature extractor 180.

The band pass filters 120, 130 and 140 are preferably selected to have non-overlapping band pass frequency ranges. Frequency ranges for three exemplary band pass filters are discussed below in relation to FIG. 2. Any number of band pass filters may be used, but normally one to three band pass filters will be used, with each band pass filter selected to have a band pass frequency range corresponding to a formant frequency range. Common formant frequency ranges are 280–710 Hertz (Hz), 870–2250 Hz and 2250–2890 Hz. By using these ranges, each adaptive IIR filter (150, 160 and 170) should track one specific peak. Each band pass filter 120, 130 and 140 produces a band pass filtered output 125, 135 and 145, respectively.

These band pass filtered outputs 125, 135 and 145 each feeds into a respective adaptive IIR filter of the set of adaptive IIR filters 150, 160 and 170. Each adaptive IIR filter tracks a spectral peak and produces information about the peak. A preferred adaptive IIR filter is discussed below in reference to FIG. 3. Spectral peak information produced by each adaptive IIR filter is preferably spectral peak locations $s_1$ through $s_z$ and/or spectral peak energy $e_1$ through $e_z$. These are discussed in more detail below in reference to FIGS. 3 and 4.

The feature extractor 180 receives the speech data and, as is known in the art, extracts spectral features from the signal at regular intervals, for example, about every 10 milliseconds. The spectral features are in the form of feature vectors that are then passed on to augmenting device 185. As is also known in the art, the feature vectors representing training data may be used to train acoustic models such as, for example, band-quantized Gaussian mixture models, which are then used by the system to decode speech data received during the course of a real-time application.

Augmenting device 185 concatenates the spectral peak information, $\{(s_1, e_1) (s_2, e_2) \ldots (s_z, e_z)\}$, onto a feature vector, $\{(f_1, \ldots, f_n)\}$, to create an augmented feature vector, $\{(f_1, \ldots, f_n) (s_1, e_1) (s_2, e_2) (s_z, e_z)\}$. The augmented feature vector is then passed to the additional speech processing elements 190. Such speech processing elements (not shown), as is known in the art, could include a linear discriminant analysis routine, hypothesis search routines, an acoustic vocabulary, a language model vocabulary, acoustic models, and a language model.

As discussed in more detail below, spectral peak information helps to increase the noise immunity of feature vectors and this particular method of estimating them also reduces the effect of noisy formant features.

While the present invention is primarily illustrated herein in the context of speech recognition, aspects of present invention are applicable to any pattern recognition system that uses feature vectors. For instance, incremental information can be determined for any system that uses feature vectors. As is known in the art, a feature vector is a vector that contains information about a class. A feature vector can be discrete, continuous, single dimensional or multidimensional. Other aspects of the present invention are applicable to any pattern data that are expected to have a spectral peak or have single spectral peaks in certain frequency ranges. For instance, an adaptive IIR filter can be used to determine spectral peak information for a single spectral peak or a number of adaptive IIR filters can be used to determine spectral peak information for single spectral peaks in each of a number of frequency bands. Still other aspects of the present invention are applicable to any pattern data that are expected to have a spectral peak or have single spectral peaks in certain frequency ranges, and where the pattern recognition system uses feature vectors. For instance, an adaptive IIR filter can be used to determine spectral peak information in a certain frequency band and this spectral peak information can augment conventional feature vectors.

Figure 2:
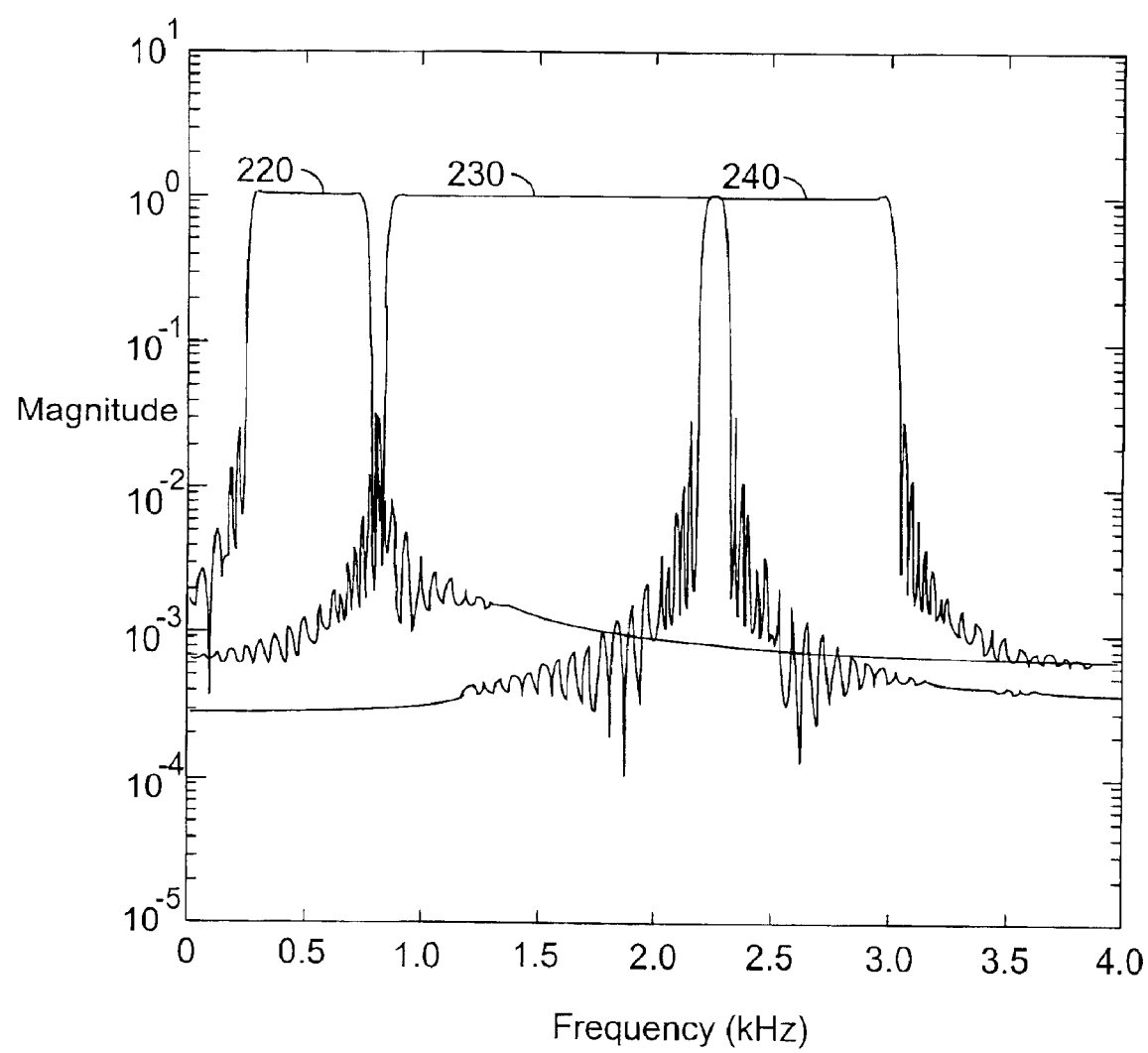
FIG. 2 is a graph of band pass frequency ranges for three band pass filters in accordance with one embodiment of the present invention.

Referring now to FIG. 2, a graph of the frequency responses for three different band pass filters are shown. These band pass filters approximate the formant frequency ranges of 280–710 Hz, 870–2250 Hz and 2250–2890 Hz. For instance, band pass response 220 approximates the 280–710 Hz formant frequency range, band pass response 230 approximates the 870–2250 Hz formant frequency range, and band pass response 240 approximates the 2250–2890 Hz formant frequency range. By using these ranges, there should only be one spectral peak (corresponding to an associated formant peak) in each of the frequency ranges. This allows an adaptive IIR filter to track, over time, the one major spectral peak in its associated band pass frequency range.

Figure 3:
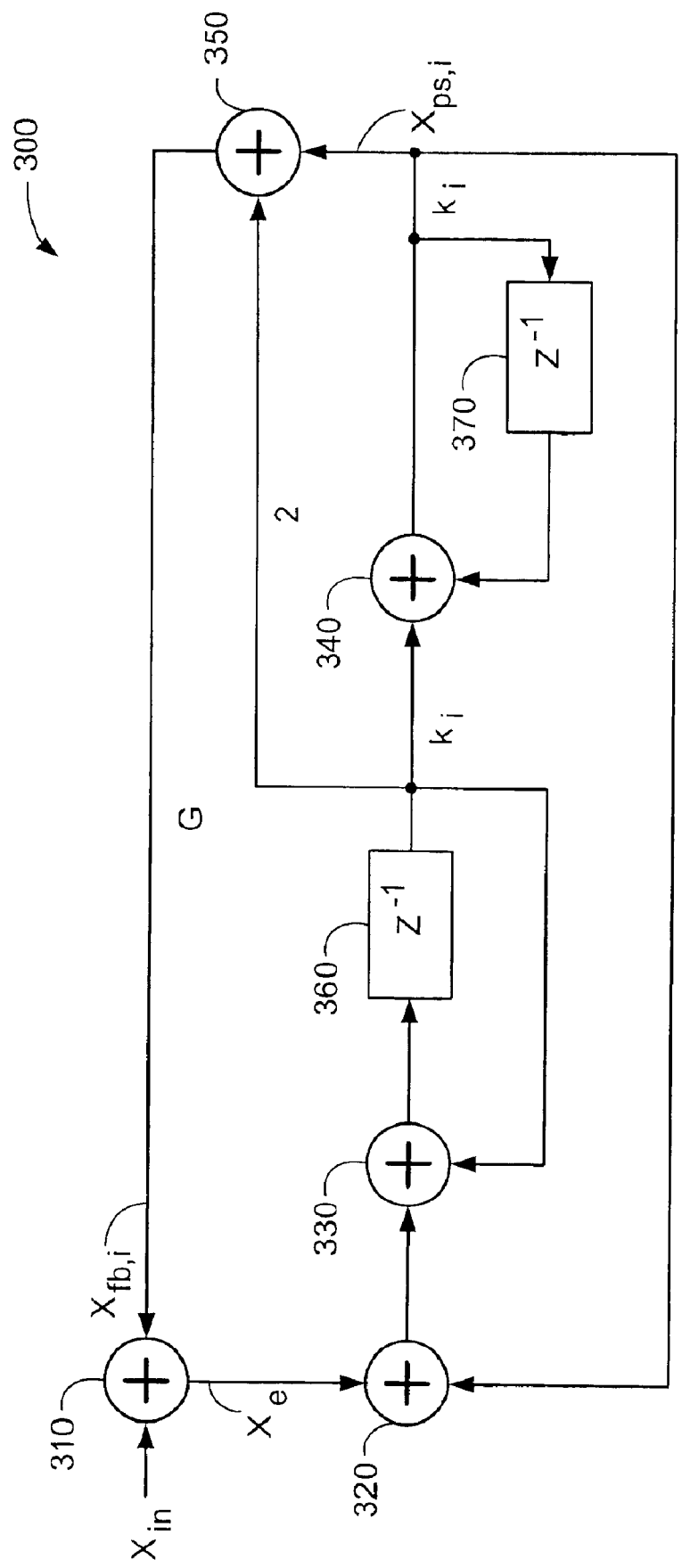
FIG. 3 is a block diagram of an adaptive Infinite Impulse Response (IIR) filter in accordance with one embodiment of the present invention.

Turning now to FIG. 3, an exemplary adaptive IIR filter 300 is shown. The adaptive IIR filter 300 comprises a number of adders 310, 320, 330, 340, and 350, two delays 360 and 370, and a number of coefficients $k_i$, 2, and G. Assuming that there are three band pass filters and denoting the outputs of these three band pass filters 120, 130 and 140 (see FIG. 1) as $y_1(t)$, $y_2(t)$ and $y_3(t)$, the adaptive IIR filter 300 identifies the spectral peak in the band-limited spectra of $y_i(t)$.

This adaptive filter structure has previously been described in Padmanabhan et al., "Resonator-Based Filter-Banks for Frequency Domain Applications," Institute for Electronic and Electrical Engineers Trans. Circuits and Systems, October 1991, the disclosure of which is incorporated by reference herein. Generally, the adaptive filter is a multiple notch IIR filter with the notch frequencies being directly related to the filter coefficients (each notch frequency depends on exactly one filter coefficient). This multiple notch transfer function is obtained by embedding several digital resonators in a feedback loop, with the notch frequencies corresponding to the resonator frequencies. The goal of the adaptive algorithm is to minimize the power of the output of the notch filter. For the case where there are N sinusoids in the input, and there are N notches in the filter transfer function, the optimal solution is when the notch frequencies are equal to the input sinusoidal frequencies. In "Resonator-Based Filter-Banks for Frequency Domain Applications," an adaptive algorithm was described that guarantees convergence under certain conditions, and that has a complexity that is linear in N.

For use with the present invention, it can be assumed that each band pass output, $y_i(t)$, has a single spectral peak. The adaptive IIR filter 300 of FIG. 3 has a single notch and can be used to track each of the $y_i(t)$. The transfer functions from the input to various nodes in the filter structure 300 are given below:

$$H_e(z) = \frac{x_e}{x_{in}} = \frac{1-(2-k_i^2)z^{-1}+z^{-2}}{1-(2-k_i^2)(1-G)z^{-1}+(1-2G)z^{-2}}, \quad \text{(Eq. 1)}$$

$$H_{fb,i}(z) = \frac{xfb,i}{x_{in}} = \frac{(2-k_i^2)z^{-1}-2z^{-2}}{1-(2-k_i^2)(1-G)z^{-1}+(1-2G)z^{-2}}, \quad \text{(Eq. 2)}$$

$$H_{ps,i}(z) = \frac{x_{ps,i}}{x_{in}} = \frac{k_i^2 z^{-1}}{1-(2-k_i^2)(1-G)z^{-1}+(1-2G)z^{-2}}. \quad \text{(Eq. 3)}$$

The transfer function $H_e(z)$ represents a notch filter, with the notch frequency, $\overline{\omega}_i$, being related to the filter coefficient, $k_i$, through the following equation:

$$k_i = 2\sin\left(\frac{w_t}{2}\right). \quad \text{(Eq. 4)}$$

The algorithm for adapting the filter coefficient is given by:

$$k_i(n+1) = k_i(n) - \mu \frac{x_e(n)x_{ps,i}(n)}{\langle x_{ps,i}(n)x_{ps,i}(n)\rangle + \varepsilon} \quad \text{(Eq. 5)}$$

The term $x_e(n)x_{ps,i}(n)$ denotes the pseudo-gradient of the objective function (i.e., the coefficient is adapted in a direction opposite the pseudo-gradient), and the term $\langle x_{ps,i}(n)x_{ps,i}(n)\rangle + \varepsilon$ denotes a power normalizing term that modifies the gradient direction to point in the Newton direction (i.e., the normalizing term approximates the inverse of the Hessian of the objective function). The $\varepsilon$ term prevents a divide-by-zero operation, should the average power term get very small. The spectral peak location can be inferred from the value of the filter coefficient $k_i$, after the coefficient has converged, using Equation 4. The $\mu$ is a rate-determining parameter. As is known in the art, one can control the rate at which the filter coefficient changes. The rate-determining parameter allows one to control the rate of change of the filter coefficient, and the parameter is usually a heuristic parameter. It is determined with sample data, and a variety of parameters are tried, with the best parameter selected. The selected rate-determining parameter is then used during real-time analysis.

An additional feature of the filter structure 300 is that the transfer function $H_{fb,i}$ is the complement of the notch transfer function ($H_e$), i.e., it represents a band pass transfer function with the center frequency corresponding to the resonator frequency, $\overline{\omega}_i$. Consequently, the power of the signal at $x_{fb,i}$ represents the power of the input speech signal at this frequency.

Thus, the spectral peak information produced by adaptive IIR filter 300 comprises the spectral peak location, $\overline{\omega}_i$ (denoted as $s_1$, $s_2$ and $s_z$ in FIG. 1), and the energy of the signal at $x_{fb,i}$ (denoted $e_1$, $e_2$ and $e_z$ in FIG. 1). A benefit of this filter structure is that this spectral peak information is less susceptible to wide band noise. Wide band noise should not change the location of a spectral peak in a formant frequency range, but could change the level of the peak. Thus, the spectral peak location should be relatively immune from wide band noise. The energy at the spectral peak location should also be relatively immune from wide band noise because the energy is determined by a function that is centered at the spectral peak location and that has a very small amount of bandwidth. Therefore, the wide band noise would have to be fairly concentrated at the spectral peak for the energy to be erroneously high.

Another benefit of the adaptive IIR filter 300 is that the spectral peak information should stay on the same trajectory. For instance, if the filter coefficient converges to a particular number (indicative of a spectral peak at a particular frequency, $\overline{107}_i$) during a time period with voiced speech segments, and then unvoiced speech segments appear at the input $x_i$, it will take a while for the filter coefficient to change to a new spectral peak frequency of the unvoiced speech segments. In fact, it may not change at all, because unvoiced speech generally contains few large peaks to which the adaptive IIR filter 300 would converge. This delayed action tends to smooth the response for both the energy and spectral peak locations. In essence, the spectral peak information is less arbitrary. This is in contrast to normal formant estimates, which will contain arbitrary formant features for unvoiced speech segments, as unvoiced speech segments do not have a formant structure.

It should be noted that any spectral peak information could be used with the present invention. The examples of the spectral peak information given above are preferred, but other spectral peak information could be used. For example, formant peak estimates could be used instead of a spectral peak information determined by adaptive IIR filter 300. If formant peak estimates are used, band pass filters and adaptive IIR filters would not be needed. The energy of a spectral peak and the spectral peak location are preferred over formant peak estimates because the latter can be noisy if the system is affected by wide band noise.

Figure 4:
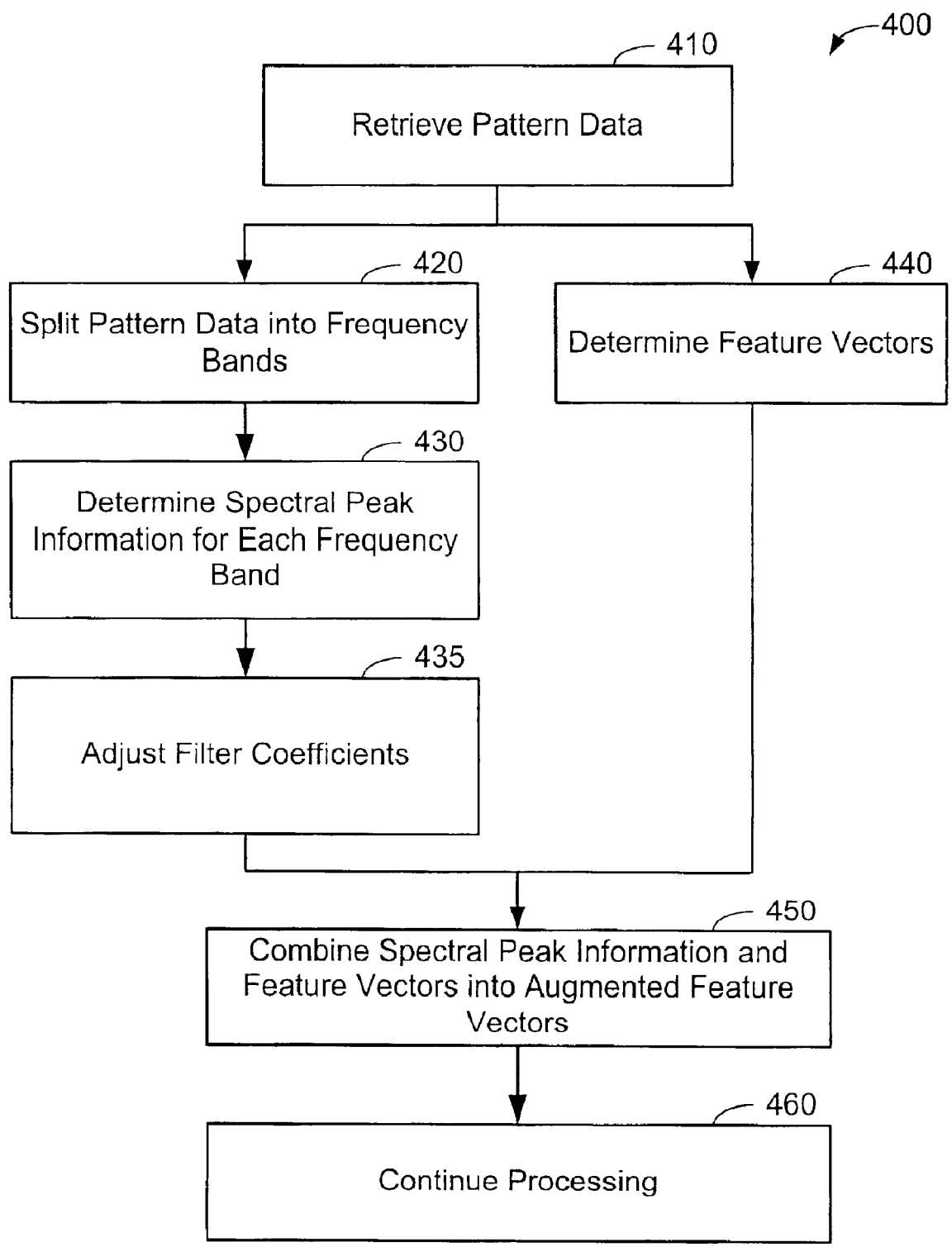
FIG. 4 is a flow chart of a method for determining and using spectral peak information in pattern recognition, in accordance with one embodiment of the present invention.

Turning now to FIG. 4, a method 400 is shown for determining and using spectral peak information in pattern recognition, in accordance with one embodiment of the present invention. Method 400 is used during real-time processing of patterns, but could be used after pattern data has been accumulated. Method 400 begins in step 410 when pattern data are retrieved. This pattern data will generally be digital samples of analog data. For example, speech data is generally digital samples of an analog waveform created by a microphone, while handwriting data might be the digital samples of an electrical transduction of a pressure plate.

After the speech data are retrieved, the pattern data are routed to both steps 420 and step 440. In step 420, the pattern data is split into a number of frequency bands. One option at this point is to split the pattern data into three frequency bands, each frequency band corresponding to a fruency range that should contain a formant peak. This is an excellent option for speech data. Another option is to split the pattern data into two or less frequency bands, which could also be used on a speech processing system if the frequency bands are chosen to coincide with two of the three formant frequency ranges. Yet another option could be to split the pattern data into more than three frequency ranges, which could be useful for visual pattern recognition. To split the pattern data, preferably band pass filters are used and designed with the appropriate band pass frequency ranges.

In step 430, the spectral peak information is determined for each frequency band. Generally, the spectral peak location and/or the energy of the spectral peak location are determined in this step for each of the frequency bands that have been band passed. In step 435, the filter coefficients for each of the adaptive IIR filters are adjusted. If adaptive IIR filters are not being used, then, if needed, other coefficients may be adjusted. For the adaptive IIR filters, an algorithm for adjusting the filter coefficients has been discussed above in reference to Equation 5.

Step 440 is performed in parallel with steps 420, 430, and 435. In step 440, the feature vectors are determined. This generally occurs through the use of a "feature vector extractor," which is designed to create feature vectors. As an illustration, a speech feature vector extractor could determine feature vectors that have 40 features. In step 450, the feature vectors and the spectral peak information are combined into augmented feature vectors. Preferably, an augmented feature vector would be a concatenation of the spectral peak information and a feature vector. This has been discussed (and shown) in reference to FIG. 1.

In step 460, other pattern recognition steps are performed. For speech, these steps could include a linear discriminant analysis routine and a hypothesis search routines. The end result of method 400 should be a feature vector that has been associated with a class and that is used to determine a pattern. The pattern could be a phone of speech that is then converted to text or a pattern equivalent of handwritten symbol that is then converted to a textual symbol.

It should be noted that these steps will usually repeat indefinitely. For instance, in a speech processing system, new speech data will constantly be input into the system. This speech data will be converted to text (or compressed) and steps 410 through 460 will be continuously repeated until the speech processing system is turned off.

By using the present invention, the feature vectors should be more immune to wide band noise and should have elements that better track spectral peaks for data with spectral peaks.

Figure 5:
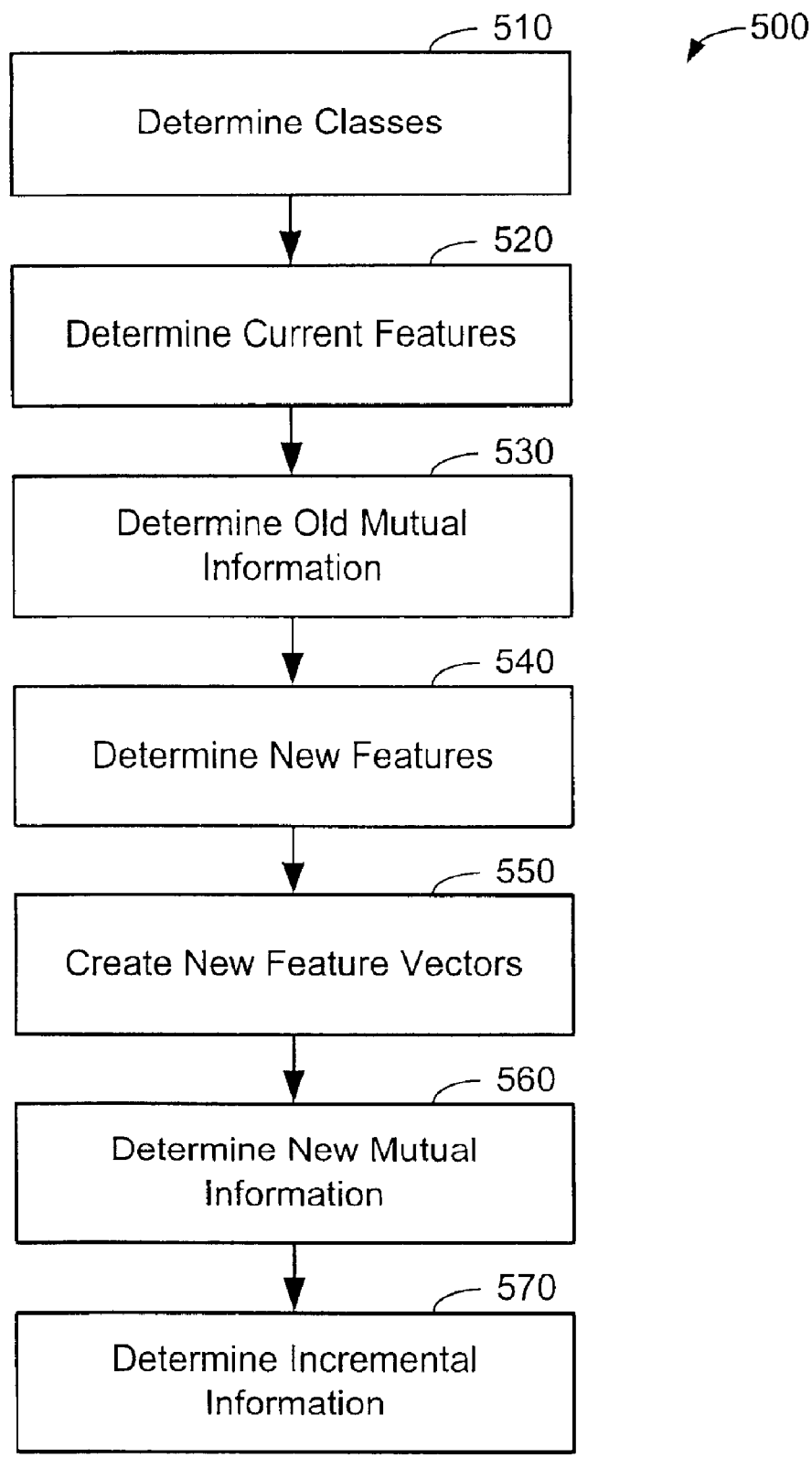
FIG. 5 is a flow chart of a method for determining and using incremental information in pattern recognition, in accordance with one embodiment of the present invention.

Turning now to FIG. 5, a method 500 is shown for determining and using incremental information. Method 500 is performed whenever it is desired that a new feature be added to a feature vector or a changed feature replace an old feature in a feature vector. Method 500 begins when classes are determined (step 510). In many situations, such as for speech processing, class determination can be quite complex and involved. For the purposes of method 500, it can be assumed that classes can be properly determined. For speech processing systems, the classes that are determined are phonetic classes.

In step 520, the current features are determined. In step 530 the "old" mutual information is determined. The usefulness of a feature may be measured by the amount of information it provides in discriminating between classes. This can be quantified by the mutual information between the feature vector and the class. Let c denote the class and Z denote the feature vector. The mutual information between Z and c is defined by:

$$I(Z; c) = \sum_c p(c) \int_Z p(Z/c) \log\left[\frac{p(Z/c)}{p(Z)}\right] dZ. \quad \text{(Eq. 6)}$$

Though Equation 6 cannot be expressed in closed form, by vector quantizing Z into an appropriate number of codewords and approximating the integral with a summation, it may be written as:

$$I(Z; c) = \sum_c p(c) \sum_{Z_j} p(Z_j/c) \log\left[\frac{p(Z/c)}{p(Z_j)}\right] \quad \text{(Eq. 7)}$$

Equation 7 is an explicit relationship between a feature vector and classes. It would be helpful to measure the amount of information available by augmenting the current feature vector with new features. To do this, the new features are determined (step 540). If the new feature is written as z, a new feature vector, $\hat{Z}$, would be created by concatenating Z with z (step 550). The new mutual information between the augmented vector $\hat{Z}$ and c can be computed from the following:

$$I(\hat{Z}; c) = \sum_c p(c) \sum_{Z_j} p(\hat{Z}_j/c) \log\left[\frac{p(\hat{Z}/c)}{p(\hat{Z}_j)}\right] \quad \text{(Eq. 8)}$$

Equation 8 is performed in step 560 of method 500. The amount of incremental information added by z can be computed through the following:

$$\delta I_z = I(\hat{Z};c) - I(Z;c). \quad \text{(Eq.9)}$$

Equation 9 is performed in step 570 of method 500. Determining the mutual information in the prior equations in method 500 is relatively simple and not very time consuming. As such, the incremental information determined in Equation 9 provides an indication of the benefit of a feature, yet costs little computationally to determine. Equation 9 can be used to determine if the mutual information of a new feature vector meets a predetermined increase in mutual information over the "old" mutual information. As an example, if a new feature adds 0.1 bits of incremental information, this could be significant if the old mutual information was 1.62 bits, as this would be a 6 percent increase in mutual information.

To use the incremental information from method 500, once one feature is analyzed using method 500, another new or changed feature can be analyzed by re-performing steps 540 through 570 with the new/changed feature. By following this process, the features that add the most amount of incremental information can be used to determine new baseline feature vectors that can be used in step 520 and compared to subsequent, even newer feature vectors in steps 530 through 570.

Although the previous discussion centered on one mutual information equation, any technique for determining the mutual information between a feature and a class may be used. For instance, in Padmanabhan, "Use of Spectral Peak Information in Speech Recognition," National Institute of Standards and Technology (NIST), Speech Transcription Workshop, May 16–19, 2000, the disclosure of which is hereby incorporated by reference, the following equation is developed for mutual information:

$$I(Z; c) = \log\left|A\sum A^T\right| - \sum_c P_c \log\left|A\sum_c A^T\right|, \quad \text{(Eq. 10)}$$

which turns out to be almost exactly the object function for the heteroschedastic discriminant analysis as described in Saon et al., "Maximum Likelihood Discriminant Feature Spaces," International Conference on Acoustics, Speech and Signal Processing (ICASSP), 2000, the disclosure of which is also incorporated herein by reference.

Figure 6:
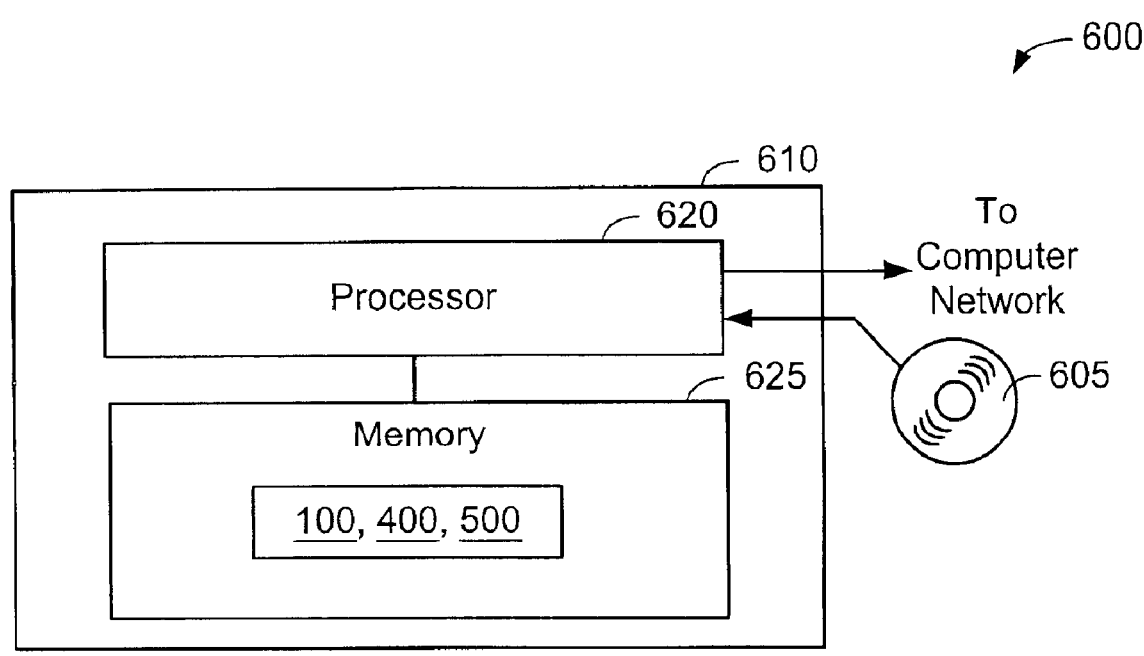
FIG. 6 is a block diagram of a system for determining and using spectral peak information and incremental information in accordance with one embodiment of the present invention.

Turning now to FIG. 6, an exemplary system 600 is shown that could be used to perform the methods and apparatus of embodiments of the present invention. System 600 comprises a compact disk 605 and a computer system 610 that itself comprises processor 620 and memory 625. Memory 625 comprises some or all of system 100, method 400 and/or method 500. As such, memory 625 will configure the processor 620 to implement the methods, steps, and functions disclosed herein. The memory 625 could be distributed or local and the processor 620 could be distributed or singular. The memory 625 could be implemented as an electrical, magnetic or optical memory, or any combination of these or other types of storage devices. Moreover, the term "memory" should be construed broadly enough to encompass any information able to be read from or written to an address in the addressable space accessed by processor 620. With this definition, information on a network is still within memory 625 of system 600 because the processor 620 can retrieve the information from the network. It should be noted that each distributed processor that makes up processor 620 will generally contain its own addressable memory space.

It should also be noted that computer system 610 could be an application-specific integrated circuit that performs some or all of the steps and functions of system 100, method 400 and/or method 500.

As is known in the art, the methods and apparatus discussed herein may be distributed as an article of manufacture (such as compact disk 605) that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of compact disk 605.

In Padmanabhan, "Use of Spectral Peak Information in Speech Recognition," it is shown spectral peak information increases the mutual information (and consequently the incremental information) and can decrease word error rate in speech recognition.

Thus, what has been shown are systems and methods for determining spectral peak information of pattern data through adaptive IIR filters, for augmenting feature vectors with features that are more robust, and for determining if a feature is a worthwhile addition to already existing feature vectors.

It is to be understood that the embodiments and variations shown and described herein are merely illustrative of the principles of this invention and that various modifications may be implemented by those skilled in the art without departing from the scope and spirit of the invention. For instance, other spectral peak information, such as formant estimates, may be used and a different spectral peak tracking device could be used in place of the adaptive IIR filters of embodiments of the present invention.

What is claimed is:

1. A method for determining spectral peak information in pattern recognition, the method comprising the steps of:
   determining current pattern data;
   determining a current filter coefficient of a filter applied to at least a portion of the current pattern data;
   determining spectral peak information of the current pattern data, at least a portion of the spectral peak information determined by using the current filter coefficient; and
   augmenting a current feature vector with the spectral peak information to create an augmented feature vector.

2. The method of claim 1, wherein the current pattern data comprises speech data.

3. The method of claim 1, further comprising the steps of:
   determining new pattern data;
   determining a new filter coefficient from the current filter coefficient and at least one additional term; and
   determining spectral peak information of the new pattern data, wherein at least a portion of the spectral peak information is determined by using the new filter coefficient.

4. The method of claim 3, wherein the new pattern data comprises speech data and the current pattern data comprises speech data.

5. The method of claim 1, wherein the step of determining spectral peak information of the current pattern data further comprises the step of determining, by using the current filter coefficient, a frequency at which a spectral peak of the current pattern data occurs.

6. The method of claim 5, wherein the step of determining spectral peak information of the current pattern data further comprises the step of determining a power in a vicinity of the spectral peak.

7. A system for determining spectral peak information in pattern recognition, the system comprising:
   a memory that stores computer-readable code; and
   a processor operatively coupled to the memory, the processor configured to implement the computer-readable code, the computer-readable code configured to:
   determine current pattern data;
   determine a current filter coefficient of a filter applied to a least a portion of the current pattern data;
   determine spectral peak information of the current pattern data, wherein at least a portion of the spectral peak information is determined by using the current filter coefficient; and
   augment a current feature vector with the spectral peak information to create an augmented feature vector.

8. The system of claim 7, wherein the current pattern data comprises speech data.

9. The system of claim 7, wherein the computer-readable code, when determining spectral peak information of the current pattern data, is further configured to determine, by using the current filter coefficient, a frequency at which a spectral peak of the current pattern data occurs.

10. The system of claim 9, wherein the computer-readable code, when determining spectral peak information of the current pattern data, is further configured to determine a power in a vicinity of the spectral peak.

11. An article of manufacture comprising:
    a computer readable medium having computer readable code means embodied thereon, the computer-readable program code means comprising:
    a step to determine current pattern data;
    a step to determine a current filter coefficient of a filter applied to the current pattern data; and
    a step to determine spectral peak information of the current pattern data, wherein at least a portion of the spectral peak information is determined by using the current filter coefficient; and
    augment a current feature vector with the spectral peak information to create an augmented feature vector.

12. The article of manufacture of claim 11, wherein the current pattern data comprises speech data.

13. The article of manufacture of claim 11, wherein the computer-readable program code means, when determining spectral peak information of the current pattern data, further comprises a step to determine, by using the current filter coefficient, a frequency at which a spectral peak of the current pattern data occurs.

14. The article of manufacture of claim 13, wherein the computer-readable program code means, when determining spectral peak information of the current pattern data, further comprises a step to determine a power in a vicinity of the spectral peak.

15. A method for determining and using spectral peak information in pattern recognition, the method comprising the steps of:
   determining pattern data;
   splitting the pattern data into at least one frequency band;
   determining spectral peak information of the at least one frequency band; and
   augmenting a feature vector with the spectral peak information to create an augmented feature vector.

16. The method of claim 15, wherein:
   the step of splitting the pattern data into at least one frequency band comprises the step of splitting the pattern data into a plurality of frequency bands;
   the step of determining spectral peak information of the at least one frequency band comprises the step of determining spectral peak information for each of the plurality of frequency bands; and
   the step of augmenting a feature vector with the spectral peak information to create an augmented feature vector comprises the step of augmenting a feature vector with the spectral peak information of each of the plurality of frequency bands to create an augmented feature vector.

17. The method of claim 15, wherein the step of determining spectral peak information of the at least one frequency band comprises determining a spectral peak frequency at which a spectral peak occurs in the at least one frequency band.

18. The method of claim 17, wherein the step of determining spectral peak information of the at least one frequency band comprises determining a power of a bandpass signal centered at the spectral peak frequency.

19. The method of claim 15, wherein:
   the step of determining spectral peak information of the at least one frequency band further comprises the step of determining a filter coefficient; and
   the method further comprises the steps of:
   determining new pattern data;
   splitting the new pattern data into at least one frequency band;
   determining new spectral peak information of the at least one frequency band, the step of determining new spectral peak information comprising determining a new filter coefficient from the old filter coefficient and at least one additional term; and
   augmenting a new feature vector with the new spectral peak information to create another augmented feature vector.

20. A system for determining spectral peak information in pattern recognition, the system comprising:
   a memory that stores computer-readable code; and
   a processor operatively coupled to the memory, the processor configured to implement the computer-readable code, the computer-readable code configured to:
   determine pattern data;
   split the pattern data into at least one frequency band;
   determine spectral peak information of the at least one frequency band; and
   augment a feature vector with the spectral peak information to create an augmented feature vector.

21. The system of claim 20, wherein the computer-readable code, when determining spectral peak information of the at least one frequency band, is further configured to determine a spectral peak frequency at which a spectral peak occurs in the at least one frequency band.

22. The system of claim 21, wherein the computer-readable code, when determining spectral peak information of the at least one frequency band, is further configured to determine a power of a bandpass signal centered at the spectral peak frequency.

23. An article of manufacture comprising:
   a computer readable medium having computer readable code means embodied thereon, the computer-readable program code means comprising:
   a step to determine pattern data;
   a step to split the pattern data into at least one frequency band;
   a step to determine spectral peak information of the at least one frequency band; and
   a step to augment a feature vector with the spectral peak information to create an augmented feature vector.

24. The article of manufacture of claim 23, wherein the computer-readable program code means, when determining spectral peak information of the at least one frequency band, further comprises a step to determine a spectral peak frequency at which a spectral peak occurs in the at least one frequency band.

25. The article of manufacture of claim 24, wherein the computer-readable program code means, when determining spectral peak information of the at least one frequency band, further comprises the step to determine a power of a bandpass signal centered at the spectral peak frequency.

26. A system for determining spectral peak information in pattern recognition, the system comprising:
   at least one band pass filter coupled to and receiving pattern data, each of the band pass filters outputting a different band pass frequency range;
   at least one adaptive Infinite Impulse Response (IIR) filter, each of the adaptive IIR filters coupled to a band pass frequency range of one of the band pass filters, each of the adaptive IIR filters determining spectral peak information for its corresponding band pass frequency range; and
   an augmenting device that augments a feature vector with the spectral peak information from each of the adaptive IIR filters to create an augmented feature vector.

27. The system of claim 26, wherein the pattern data comprises speech data.

28. A method for determining incremental information in pattern recognition, the method comprising the steps of:
   determining a current feature vector;
   determining a class;
   determining current mutual information between the current feature vector and the class;
   determining an augmented feature vector;
   determining augmented mutual information between augmented feature vector and the class; and
   determining the incremental information added by the augmented feature vector.

29. The method of claim 28, wherein the step of determining the incremental information comprises the step of determining the incremental information by subtracting the current mutual information from the augmented feature information.

30. The method of claim 28, wherein:

determining current mutual information between the current feature vector and the class further comprises the step of vector quantizing the current feature vector into a predetermined number of codewords; and the step of determining augmented mutual information further comprises the step of vector quantizing the augmented feature vector into an augmented number of codewords, wherein the augmented number of codewords is equivalent to the predetermining number.

31. A system for determining incremental information in pattern recognition, the system comprising:

a memory that stores computer-readable code; and a processor operatively coupled to the memory, the processor configured to implement the computer-readable code, the computer-readable code configured to:

determine a current feature vector;

determine a class;

determine current mutual information between the current feature vector and the class;

determine an augmented feature vector;

determine augmented mutual information between augmented feature vector and the class; and determine the incremental information added by the augmented feature vector.

32. An article of manufacture comprising:

a computer readable medium having computer readable code means embodied thereon, the computer readable program code means comprising:

a step to determine a current feature vector;

a step to determine a class;

a step to determine current mutual information between the current feature vector and the class;

a step to determine an augmented feature vector;

a step to determine augmented mutual information between augmented feature vector and the class; and a step to determine the incremental information added by the augmented feature vector.

* * * * *

UNITED STATES PATENT AND TRADEMARK OFFICE
CERTIFICATE OF CORRECTION

PATENT NO. : 6,920,424 B2
DATED : July 19, 2005
INVENTOR(S) : Padmanabhan

It is certified that error appears in the above-identified patent and that said Letters Patent is hereby corrected as shown below:

Column 1,
Line 12, before the section entitled "Field of the Invention" and after the section entitled "Cross Reference to Related Applications" insert:

-- Statement of Government Rights

This invention was made with Government support under prime contract MDA972-97-C-0012. The Government has certain rights in this invention. --.

Column 6,
Line 9, before "during" and after "frequency" replace "$\overline{107_t}$" with -- $\overline{\varpi}_t$ --.

Column 8,
Lines 52-53, replace "$I(Z;c) = \log\left|A\sum_c A^T\right| - \sum_c P_c \log\left|A\sum_c A^T\right|$" with -- $I(Z;c) = \log\left|A\sum A^T\right| - \sum_c P_c \log\left|A\sum_c A^T\right|$ --.

Signed and Sealed this

Eighteenth Day of October, 2005

JON W. DUDAS
*Director of the United States Patent and Trademark Office*